US005440584A

United States Patent [19]

Wiese

[11] Patent Number: 5,440,584

[45] Date of Patent: Aug. 8, 1995

[54] PROCESS FOR TRANSMITTING OR STORING OVER DISTURBED CHANNELS A DIGITALIZED, ENCODED AUDIO SIGNAL COMPOSED OF A SERIES OF INFORMATION BLOCKS

[75] Inventor: Detlef Wiese, Goldach, Germany

[73] Assignee: Institut fuer Rundfunktechnik GmbH, Munich, Germany

[21] Appl. No.: 211,825

[22] PCT Filed: Oct. 20, 1992

[86] PCT No.: PCT/EP92/02401

§ 371 Date: Apr. 20, 1994

§ 102(e) Date: Apr. 20, 1994

[87] PCT Pub. No.: WO93/08656

PCT Pub. Date: Apr. 29, 1993

[30] Foreign Application Priority Data

Oct. 24, 1991 [DE] Germany ........................ 41 35 070.7

[51] Int. Cl.$^6$ .............................................. H04B 14/04

[52] U.S. Cl. .................................. 375/242; 371/37.1; 371/44; 341/64

[58] Field of Search ................... 375/25, 26; 371/37.1, 371/37.2, 38, 44; 341/64, 67

[56] References Cited

U.S. PATENT DOCUMENTS

| | | | |
|---|---|---|---|
| 4,747,104 | 5/1988 | Piret | 371/38.1 |
| 5,105,442 | 4/1992 | Wei | 375/39 |
| 5,164,963 | 11/1992 | Lawrence et al. | 375/39 |
| 5,289,501 | 2/1994 | Seshadri et al. | 371/37.1 |

FOREIGN PATENT DOCUMENTS

| | | |
|---|---|---|
| 0139803 | 8/1985 | European Pat. Off. . |
| 3805169 | 8/1989 | Germany . |
| 90/06647 | 6/1990 | WIPO . |
| 92/17948 | 10/1992 | WIPO . |

OTHER PUBLICATIONS

W. C. Wong et al.: "Estimation of unreliable packets in subband coding". IEE Proceedings-I, vol. 28, No. 1, Feb. 1991, Stevenage, GB, pp. 43–49.

*Primary Examiner*—Stephen Chin
*Assistant Examiner*—Bryan Webster
*Attorney, Agent, or Firm*—Spencer, Frank & Schneider

[57] ABSTRACT

Digitalized encoded audio signals for transmission over disturbed channels are composed of a series of information blocks made of information units containing various types of information, such as control information, scale factor information and information on encoded scanning values derived from partial-band and/or transformation coding at the source. The units of information concerning the encoded scanning values are allocated to a predetermined spectral structure. Before its transmission or storage, the encoded audio signal is subjected to a channel encoding dependent on the desired error protection. When errors are recognized, they are corrected, and when the errors cannot be corrected, they are concealed. For the channel encoding of the units of information concerning the encoded scanning values, a variable bit error protection is provided depending on the allocation of the individual information unit to a determined spectral structure, i.e., units of information concerning the encoded scanning values of lower frequency audio signal fractions are given a higher bit error protection than units of information concerning the encoded scanning values of higher frequency audio signal fractions. The variable error protection to be selected for the individual information units is further determined depending on the admissible duration and frequency, according to subjective criteria, of the applied error concealment.

3 Claims, 3 Drawing Sheets

PROCESS FOR TRANSMITTING OR STORING OVER DISTURBED CHANNELS A DIGITALIZED, ENCODED AUDIO SIGNAL COMPOSED OF A SERIES OF INFORMATION BLOCKS

BACKGROUND OF THE INVENTION

1. Field of the Invention

The invention relates to a method of transmitting or storing a digitized encoded audio signal composed of a sequence of information blocks over interference affected channels, wherein the individual information blocks are composed of information units containing different informations, such as control informations, scale factor informations as well as informations about the encoded sampled values derived from a sub-band and/or transformation source coding process, with the units for the informations being associated with respect to the encoded sampled values with a certain spectral structure and wherein the encoded audio signal is subjected to channel coding that is dimensioned according to the desired error protection, with an error correction being effected in the case of the detection of an error and, if such errors are not correctable, the errors being concealed. Such a method is disclosed in International Publication WO A, 92 179 48.

2. Description of the Related Art

For the transmission of digitally coded audio signals over radio channels or other interference affected channels it is desired to have a relatively high bit error protection at the transmitting end in order to ensure reception under poor transmission conditions as well, for example, when there is shading in mobile reception. This requires a correspondingly high redundancy in the transmitted binary positions of the digitally coded signal which is connected with high data rates. To reduce the data rate, bit saving source codes based on a reduction of redundance and irrelevance are usually employed before the channel coding. In such bit saving source coding methods, the digitally sampled audio signal is converted into sub-band sampled values by using a filter bank and/or into spectral sampled values by using a transformation into the frequency domain. In addition to the sampled values, additional and control informations, such as, for example, scale factors, scale factor selection informations and bit assignment informations are transmitted, that is, successive information units of different content must be transmitted, with a sequence of such information units being combined into an information block (also called "information frame"). Bit errors at individual binary positions within an information block produce a different, subjective noise effect for the listener. For example, the interference in a bit assignment in the radio channel may temporarily lead to a complete absence on the playback side and thus to muting of the audio signal for a certain duration. These control informations must therefore be protected to a considerably greater extent than the encoded sampled values. In connection with the error protection of the encoded sampled values, it applies that the listener has difficulties discerning a bit error in a lower value binary position of the encoded sampled value and sometimes is unable to discern it at all.

DE 3,805,169.C2 discloses the provision of a variable bit error protection which is adapted to the varying significance of the individual binary positions of each information block. In the case of increasingly poorer transmission conditions, the less important binary positions of the information block are interfered with first since these binary positions receive less error protection than the higher valued binary positions. With increasingly poorer transmission conditions, the interference progresses to increasingly more important binary positions, with the subjective noise effect being describable as "discernible", "slightly annoying" up to "unpleasantly annoying". In this connection it is assumed that it is possible only to correct the error in the received encoded audio signal data not to conceal the errors so that relatively high subjective noise effects may develop.

From the International Publication WO, A, 92 179 48 it is known to positively conceal interfered-with subbands or spectral values and thus reduce the subjective noise effect.

SUMMARY OF THE INVENTION

The present invention provides a method of transmitting or storing a digitized encoded audio signal composed of a sequence of information blocks over interference affected channels, wherein the individual information blocks are composed of information units containing different informations, such as control informations, scale factor informations as well as informations about the encoded sampled values derived from a sub-band and/or transformation source coding process, with the information units being associated with respect to encoded sampled values with a certain spectral structure and wherein the encoded audio signal is subjected to channel coding that is dimensioned according to a predetermined error protection, the method including the steps of effecting an error correction when an error is detected and, if the error is not correctable, concealing the error, providing a variable bit error protection for the channel coding of the information units with respect to the encoded sampled values, the variable bit error protection being a function of the different association of the individual information units with a predetermined spectral structure so that information units for the encoded sampled values of lower frequency audio signal components have a higher bit error protection than information units for the encoded sampled values of higher frequency audio signal components, determining a selected variable error protection for the individual information units according to subjective criteria as a function of a permissible duration and frequency of error concealment measures employed, and containing informations regarding additional error protection with respect to expanded error detection in at least one unit for the succession of information units regarding the encoded sampled values.

Advantageous modifications of the method according to the invention are defined in the dependent claims.

The invention is based on the consideration of utilizing the differences in significance of the information units within each information block for a continuously staggered variable error protection in such a way that interference in the transmission results in defined interference patterns which can be easily concealed by suitable techniques. By permitting these error patterns, the data rate for transmission can be reduced since fewer data than in the prior art are required for sufficient error protection.

BRIEF DESCRIPTION OF THE DRAWINGS

The invention will be described in greater detail with reference to the drawings, in which.

DETAILED DESCRIPTION OF THE PREFERRED EMBODIMENTS

Figure 1:
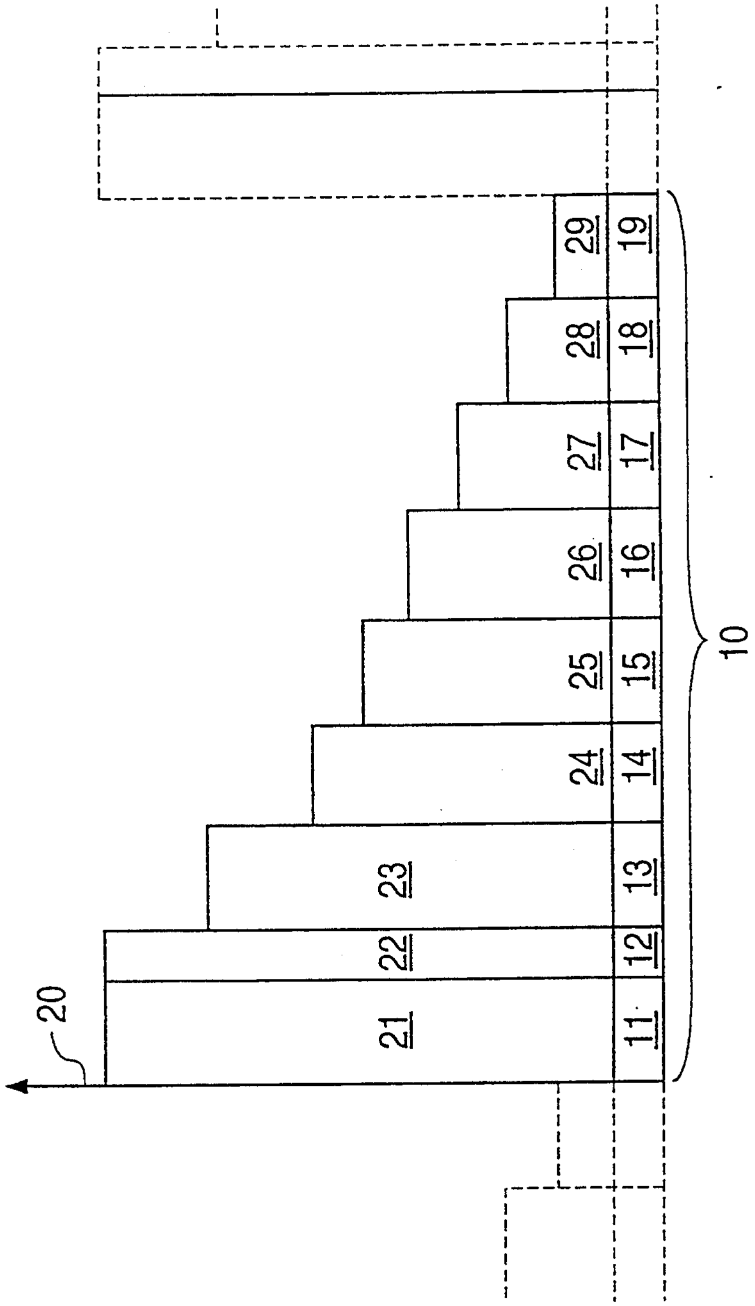
FIG. 1 is a schematic representation of an information block composed of a sequence of nine information units provided with different error protection levels as employed in the method according to the invention.

It is assumed hereinafter that a sub-band method is employed as the source coding method in which the frequency band of the digitized audio signal is split into a plurality of sub-bands. Each sub-band is assigned to one of six sub-band groups. The bit assignment and thus the data reduction of the sampled values of each sub-band is effected according to psychoacoustic aspects (calculation of masking threshold). For this purpose, the peak value of a certain number of successive sampled values is determined in each sub-band and is retained in quantized form as the so-called "scale factor" and is subjected to channel coding together with the data reduced sampled values and the bit assignment information. In addition to the scale factors, selection information for the absolutely necessary scale factors may be transmitted in order to further reduce the number of scale factors to be transmitted and thus the quantity of data. The FIG. 1 is a schematic representation of such a data reduced, channel coded audio signal 1 that is composed of a plurality of successive information blocks 10. The information blocks 10 preferably all have the same length and, in the illustrated example, each comprise a sequence of nine information units 11 to 19. According to the source coding scheme under consideration, the nine information units 11 to 19 contain the following information:

| | |
|---|---|
| unit 11 | bit assignment information |
| unit 12 | scale factor selection information |
| unit 13 | scale factors |
| unit 14 | sub-band group No. 1 |
| unit 15 | sub-band group No. 2 |
| unit 16 | sub-band group No. 3 |
| unit 17 | sub-band group No. 4 |
| unit 18 | sub-band group No. 5 |
| unit 19 | sub-band group No. 6 |

According to the invention, a varying bit error protection 21 to 29 is assigned to the individual information units 11 to 19 during channel coding. The bit assignment information 11 and the scale factor selection information 12 require high error protection 21 and 22, respectively, since bit errors within these information units may lead to the complete destruction of the audio signal at the output of the source decoder. Since interfered-with scale factors 13 have an extremely annoying subjective effect, they also require a relatively high error protection 23. Sub-band groups No. 1 to No. 5, which are illustrated as information units 14 to 19, are treated differently with respect to their error protection 24 to 29. The sub-band sampled values of the sub-bands of the lower frequency range are contained in information unit 14, those of the highest frequency range to be transmitted are contained in information unit 19. Sub-band groups No. 1 to No. 6, represented by information units 11 to 19, are assigned the data reduced sub-band sampled values according to their spectral association. The sub-band groups are thus given a different level of error protection 24 to 29 which decreases from the low frequencies to the high frequencies. The continuously staggered bit error protection in the individual units at the borders of each unit is adapted to the bit error protection of the respective adjacent information unit.

Figure 2:
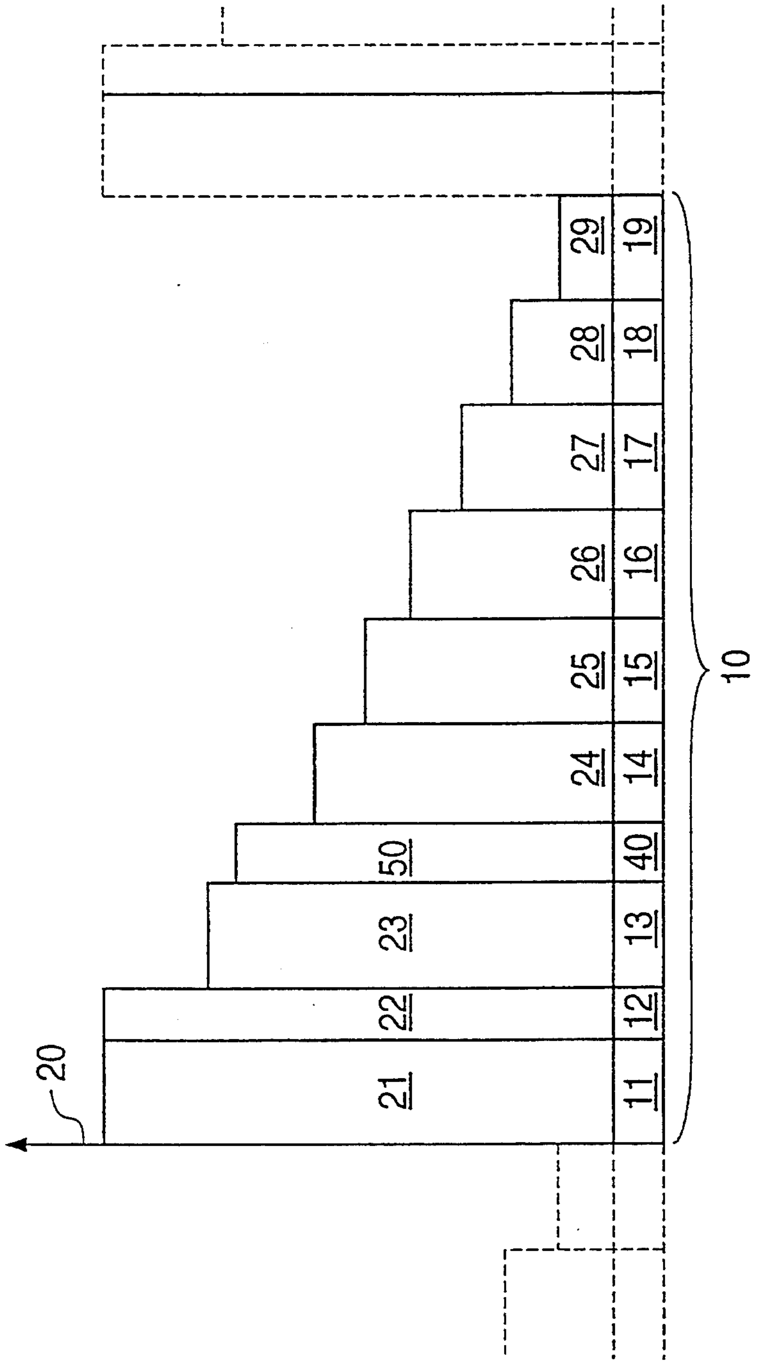
FIG. 2 is a schematic representation similar to FIG. 1 for an alternative embodiment.
Figure 3:
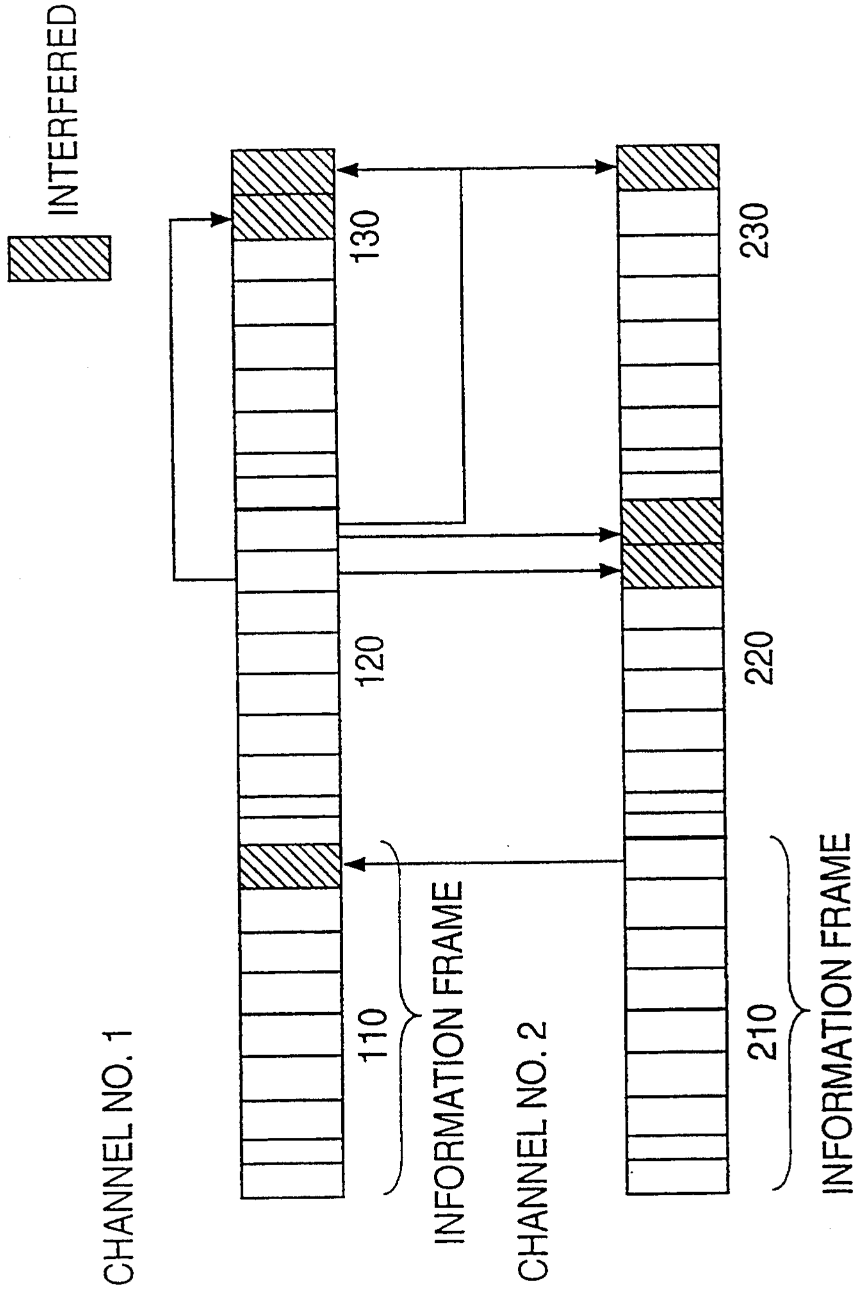
FIG. 3 is a schematic representation of the two channels of a stereophonic audio signal that has been channel coded according to the method of the invention as shown in FIG. 2 after the channel decoding.

In the embodiment of FIG. 2, an additional information unit 40 which provides additional error protection 50 for units 14 to 19 with respect to better error detection is introduced between information units 13 and 14 in order to be better able to detect errors in units 14 to 19. An application of this better error detection is shown in FIG. 3 for a two-channel stereophonic audio signal. Three successive information blocks 110, 120, 130 and 210, 220, 230, respectively, are shown in each one of the two channels No. 1 and No. 2. As shown in FIG. 1 for block 10, each one of these blocks is composed of nine information units. As indicated by hatching, one or two information units containing sub-band group information are interfered with in each one of blocks 110, 130, 220 and 230. This interference can be detected with the aid of the additional error protection 50 of FIG. 2. As an example for error concealment, FIG. 3 indicates that the respective interfered with unit(s) are replaced by information units either (a) from the adjacent channel where they are present at the same time and in the same sub-band group; or (b) from the same channel where they are present in the preceding information block in the same sub-band group. These possibilities of substitution or concealment are shown in FIG. 3 by the respective arrows.

I claim:

1. A method of transmitting or storing a digitized encoded audio signal composed of a sequence of information blocks over interference affected channels, wherein the individual information blocks are composed of information units containing different informations, with the information units being associated with respect to encoded sampled values with a certain spectral structure and wherein the encoded audio signal is subjected to channel coding that is dimensioned according to a predetermined error protection, the method comprising the steps of:

effecting an error correction when an error is detected and, if the error is not correctable, concealing the error;

providing a variable bit error protection for the channel coding of the information units with respect to the encoded sampled values, the variable bit error protection being a function of the different association of the individual information units with a predetermined spectral structure so that information units for the encoded sampled values of lower frequency audio signal components have a higher bit error protection than information units for the encoded sampled values of higher frequency audio signal components;

determining a selected variable error protection for the individual information units according to subjective criteria as a function of a permissible duration and frequency of error concealment measures employed; and containing informations regarding additional error protection with respect to expanded error detection in at least one unit for the succession of information units regarding the encoded sampled values.

2. A method according to claim 1, further comprising the step of providing a continuously staggered bit error protection for the channel coding in individual information units regarding the encoded sampled values.

3. A method according to claim 2, further comprising the step of adapting the continuously staggered bit error protection in the individual information units at the borders of each unit to the bit error protection of the respective adjacent information unit.

* * * * *